United States Patent [19]

Tokumaru et al.

[11] Patent Number: 5,105,311
[45] Date of Patent: Apr. 14, 1992

[54] ZOOM LENS SYSTEM HAVING HIGH ZOOM RATIO RANGING TO WIDE FIELD ANGLE

[75] Inventors: Hisashi Tokumaru, Sayama; Mitsuko Date, Sakai, both of Japan

[73] Assignee: Minolta Camera Kabushiki Kaisha, Osaka, Japan

[21] Appl. No.: 574,000

[22] Filed: Aug. 28, 1990

[30] Foreign Application Priority Data

Aug. 28, 1989 [JP] Japan ................................ 1-221298

[51] Int. Cl.$^5$ ............................................. G02B 15/00
[52] U.S. Cl. .................................... 359/686; 359/676; 359/642
[58] Field of Search ....................... 359/686, 676, 642

[56] References Cited

U.S. PATENT DOCUMENTS

| | | | |
|---|---|---|---|
| 4,494,828 | 1/1985 | Masumoto et al. | 350/427 |
| 4,592,626 | 6/1986 | Fujii | 359/686 |
| 4,666,257 | 5/1987 | Tanaka et al. | 350/427 |
| 4,666,258 | 5/1987 | Kimura | 359/686 |
| 4,673,258 | 6/1987 | Masamoto | 350/427 |
| 4,701,033 | 10/1987 | Masumoto | 359/686 |
| 4,789,229 | 12/1988 | Yamanashi | 350/427 |
| 4,822,152 | 4/1989 | Yamanashi | 359/686 |
| 4,896,950 | 1/1990 | Endo et al. | 350/427 |

*Primary Examiner*—Bruce Y. Arnold
*Assistant Examiner*—Hung Xuan Dang
*Attorney, Agent, or Firm*—Price, Gess & Ubell

[57] ABSTRACT

A compact size zoom lens system ranging to a wide field angle and having a high zoom ratio of up to 10. The zone lens system is composed of, from the object to the image side, a positive first lens group, a negative second lens group, a positive third lens group and a negative fourth lens group, and fulfills the following conditions:

$$0.15 < f_s/f_1 < 0.3$$

$$0.45 < f_L/f_s(|f_2|) < 0.8$$

$$0.15 < f_3/f_1 < 0.32$$

where $f_1$, $f_2$, and $f_3$ are the focal lengths of the first, second and third lens groups respectively, and $f_s$ and $f_L$ are respectively the shortest and the longest focal lengths of the zoom lens system. When the zoom lens is zoomed from wide to tele, the first lens group moves toward the object side, the distance between the second and third lens groups is decreased, and both the second and third lens groups are moved toward the object side. The following conditions may be added:

$$0.35 < f_1/f_L < 0.4$$

$$1.2 < |f_4|/|f_2| < 4.8$$

for defining the refractive power of the fourth lens group. The third lens group may be divided into two lens groups that floats during a zooming of the zoom lens system.

7 Claims, 9 Drawing Sheets

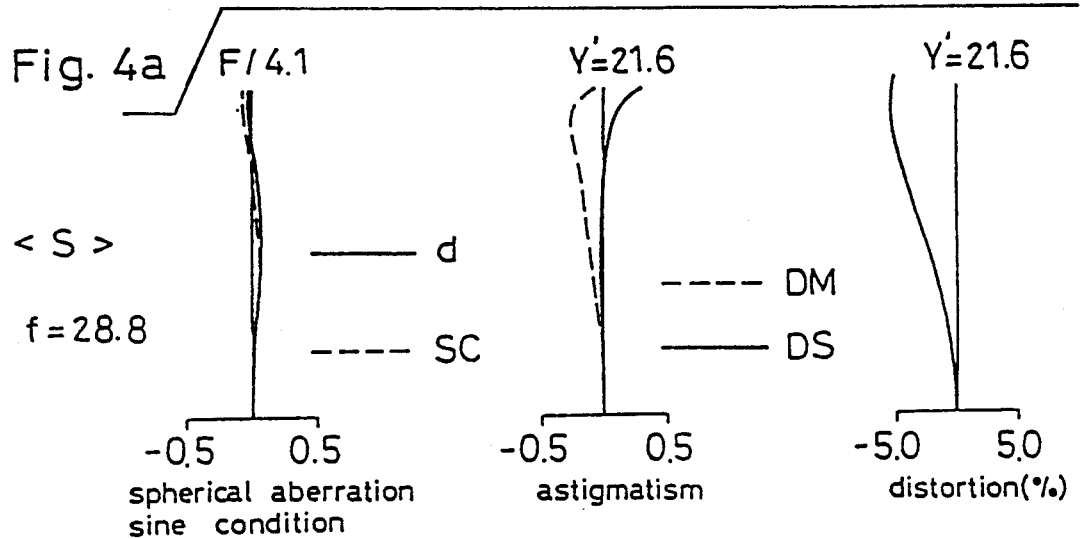
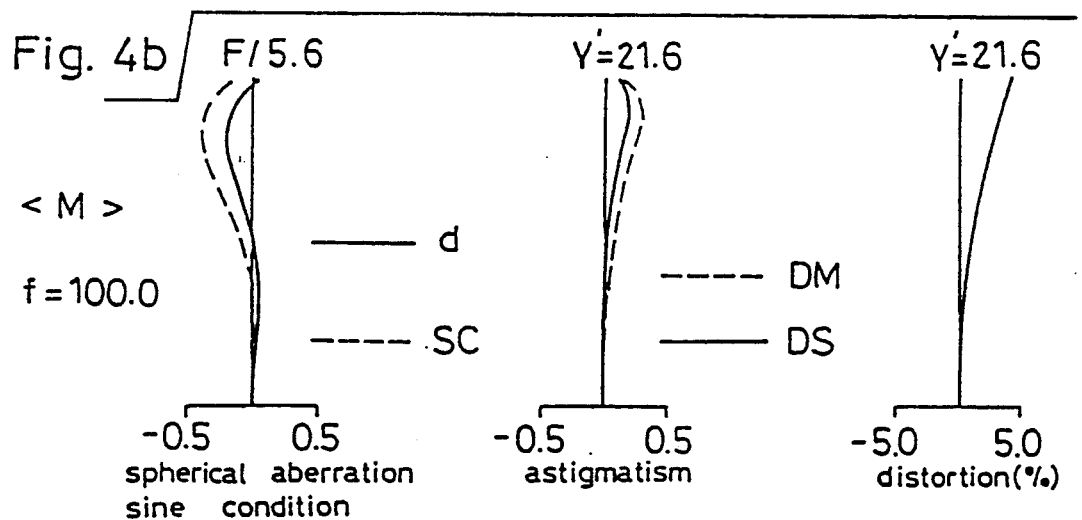

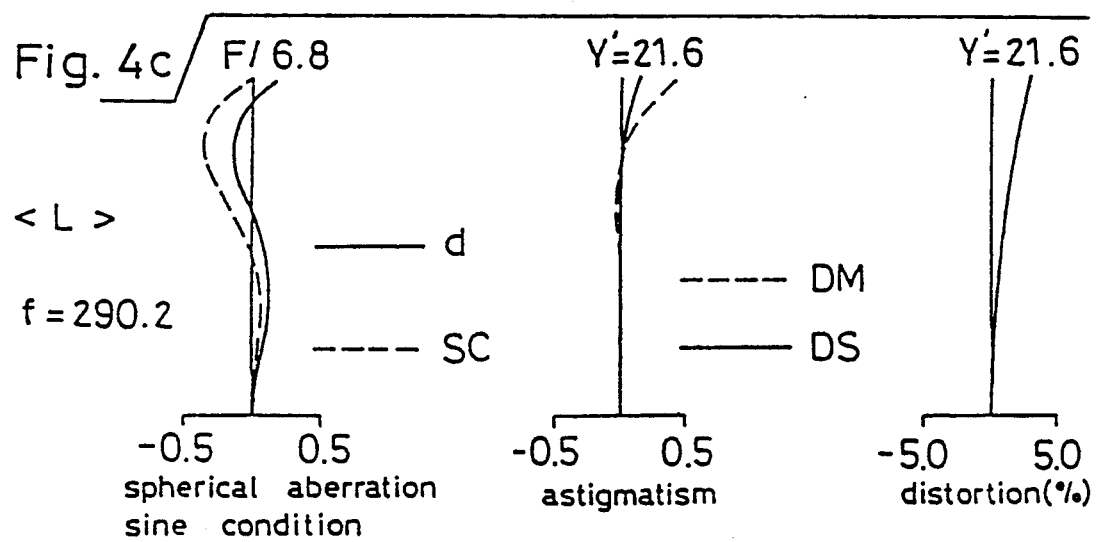

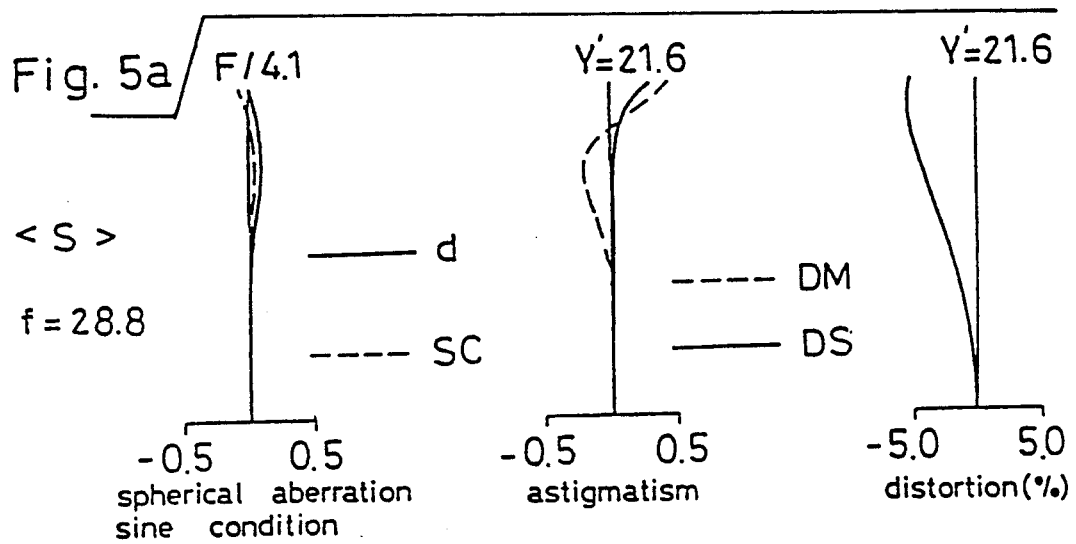
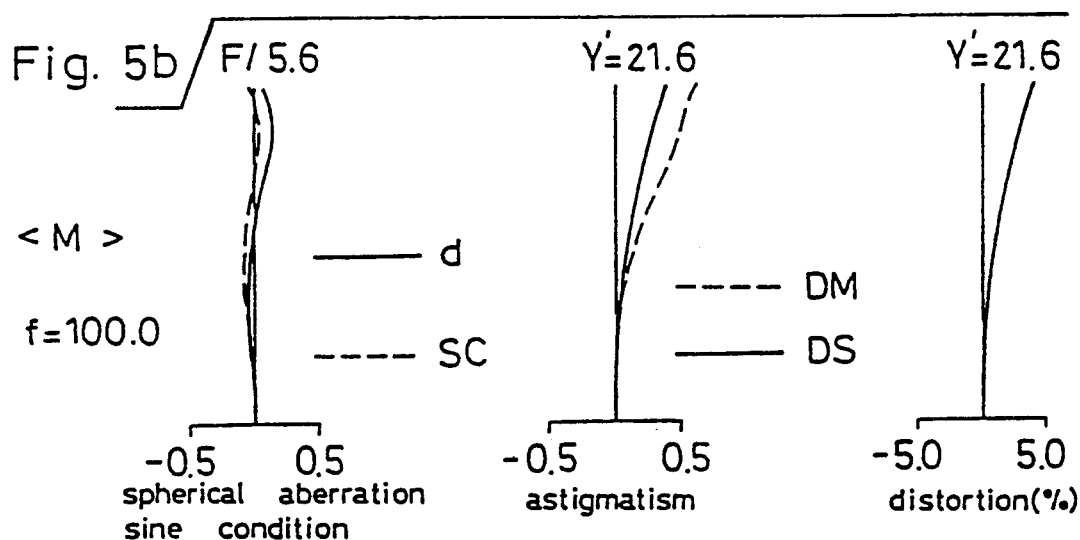

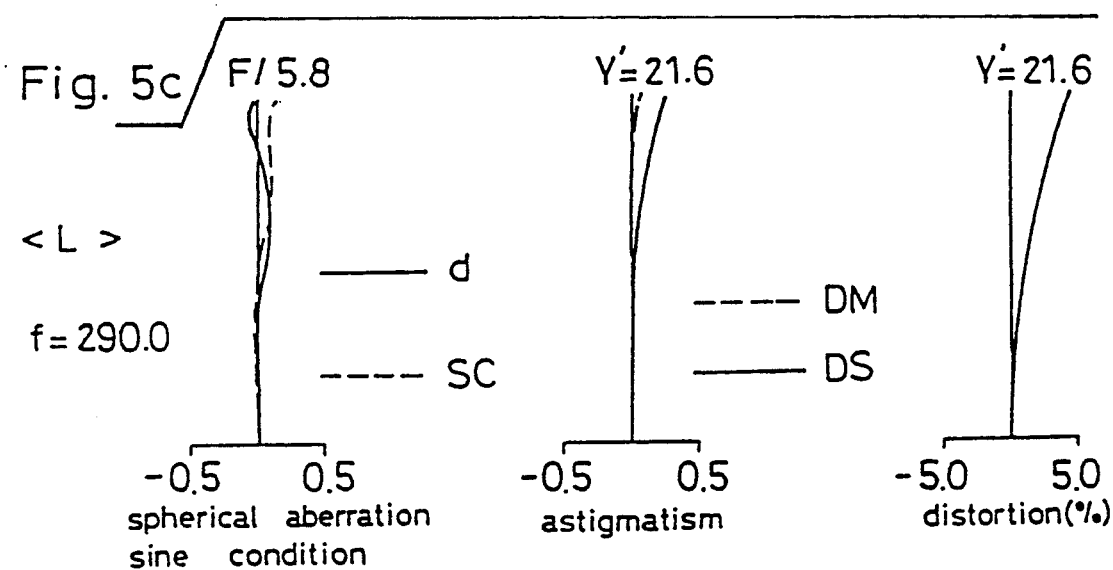

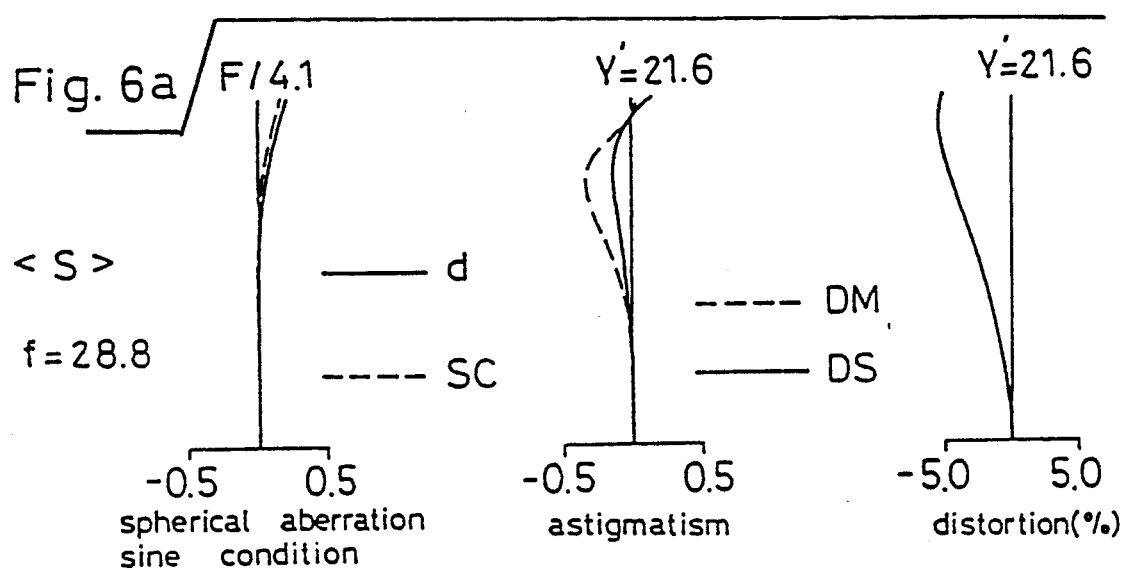
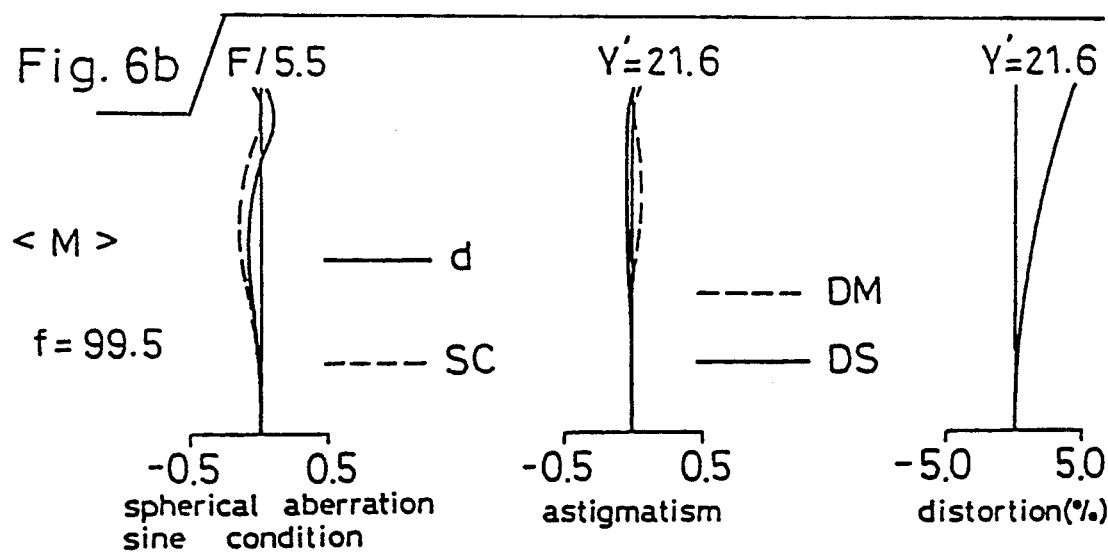

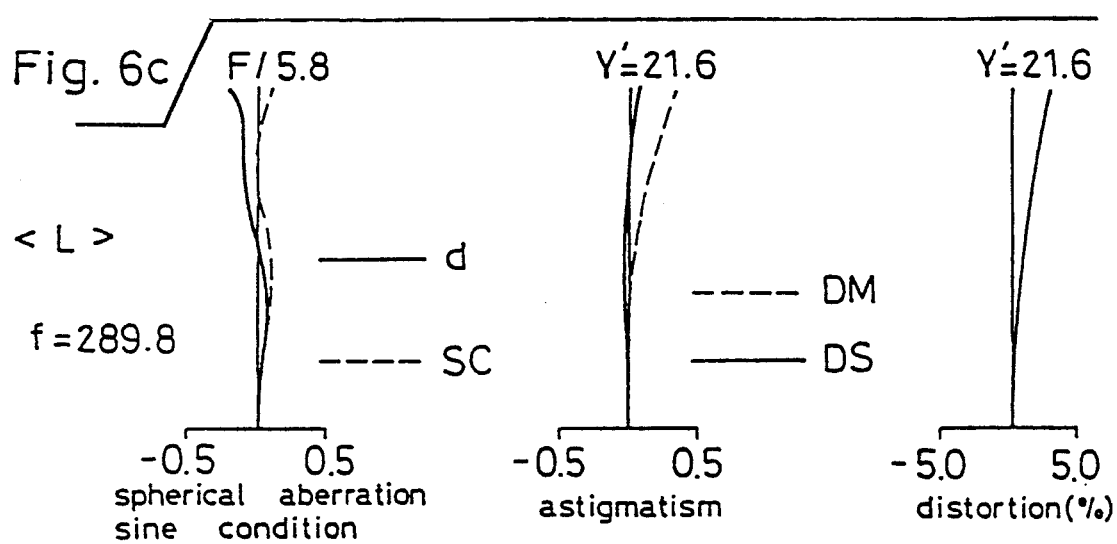

ZOOM LENS SYSTEM HAVING HIGH ZOOM RATIO RANGING TO WIDE FIELD ANGLE

BACKGROUND OF THE INVENTION

1. Field of the Invention

The present invention relates to a compact zoom lens system having a high zoom ratio (up to about 10) ranging from a wide field angle to a telephoto angle. The zoom lens system of the present invention is especially suitable for use in a still camera.

2. Description of the Related Art

One type of conventional zoom lens system ranging to a wide field angle is constructed by two lens groups: a negative front lens group and a positive rear lens group. When the zoom ratio is increased in this two lens group type, the shifting amount of the rear lens group will be very large, which practically limits the zoom ratio of this type up to about 2-2.5.

An improvement of the above-mentioned two lens group type is a four lens group type, in which the rear lens group of the former type is divided into three lens groups, consisting of negative-positive-negative-positive lens groups. The zoom ratio is expanded up to 3-4 with this type, but the market demand these days is for a still higher zoom ratio. It is well known that as the zoom ratio becomes higher, the zooming function is promoted but the aberrations will deteriorate and the size of the zoom lens system will grow larger.

Many zoom lens systems have been proposed so far (some of them are described in the U.S. Pat. Nos. 4,494,828; 4,666,257; 4,673,258; 4,701,033; 4,789,229; 4,896,950; and the Japanese Published Unexamined Patent Application Nos. S57-192917, S61-212814, S63-208015, H1-178912, H1-197713, H1-223409, H1-252915) but non has been successful in achieving a compact zoom lens system having a high zoom ratio ranging to a wide field angle.

SUMMARY OF THE INVENTION

An object of the present invention is to provide a zoom lens system having a relatively high zoom ratio, such as a zoom ratio of up to 10, while maintaining a compact size.

Another object of the present invention is to provide a zoom lens system whose photographic angle ranges to a wide field angle in which the shortest focal length is less than the length of the diagonal line of the effective image plane. In the case of, for example, a 35 mm camera, the focal length of the zoom lens system ranges approximately from 28 mm to 300 mm.

Still another object of the present invention is to provide a zoom lens system with aberrations adequately suppressed.

The features of the present invention will be detailed with reference to specific embodiments.

BRIEF DESCRIPTION OF THE DRAWINGS

FIGS. 4a-4c show aberration curves of the first embodiment of the present invention.

FIGS. 5a-5c show aberration curves of the second embodiment of the present invention.

FIGS. 6a-6c show aberration curves of the third embodiment of the present invention.

DETAILED DESCRIPTION OF THE PREFERRED EMBODIMENTS

Figure 1:
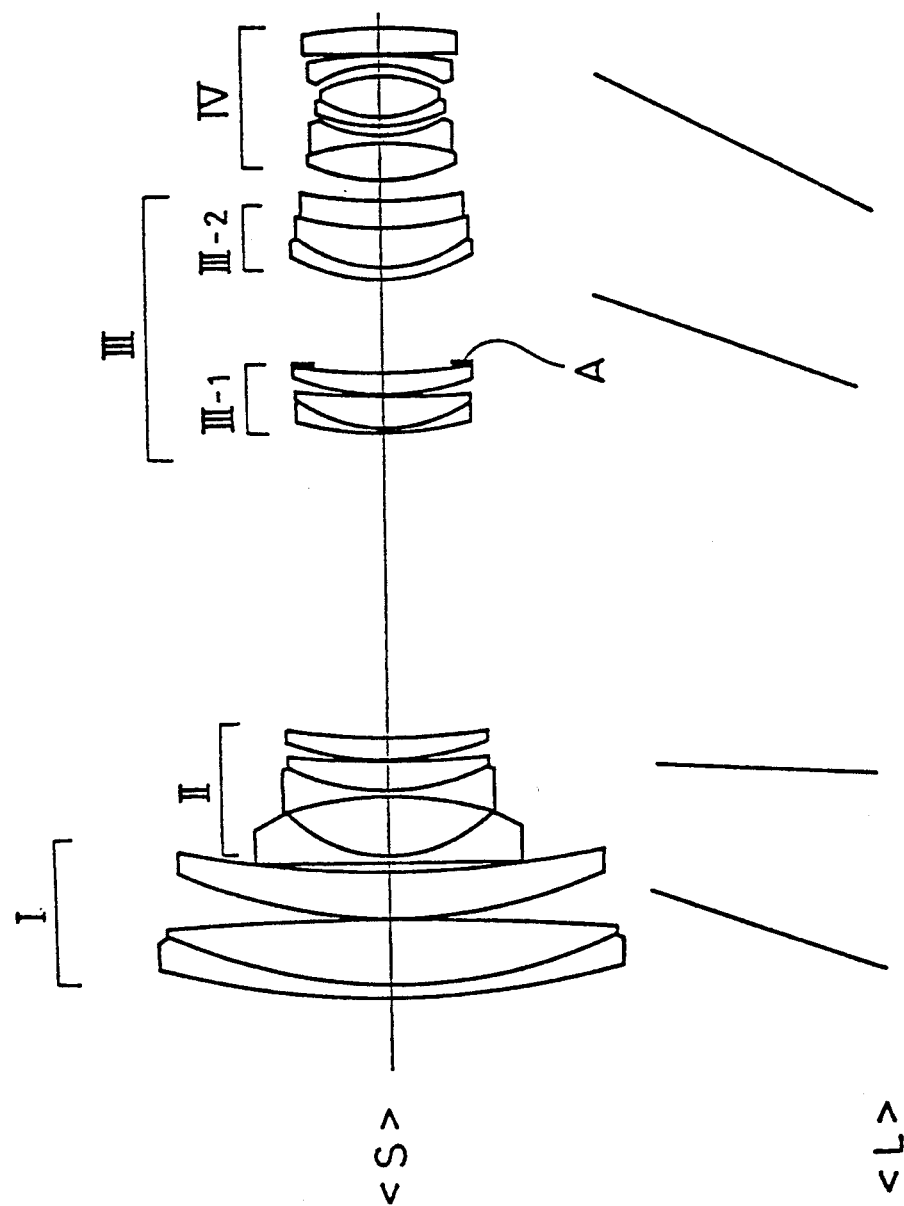
FIG. 1 shows a sectional view illustrating the lens configuration of the first embodiment of the present invention.
Figure 2:
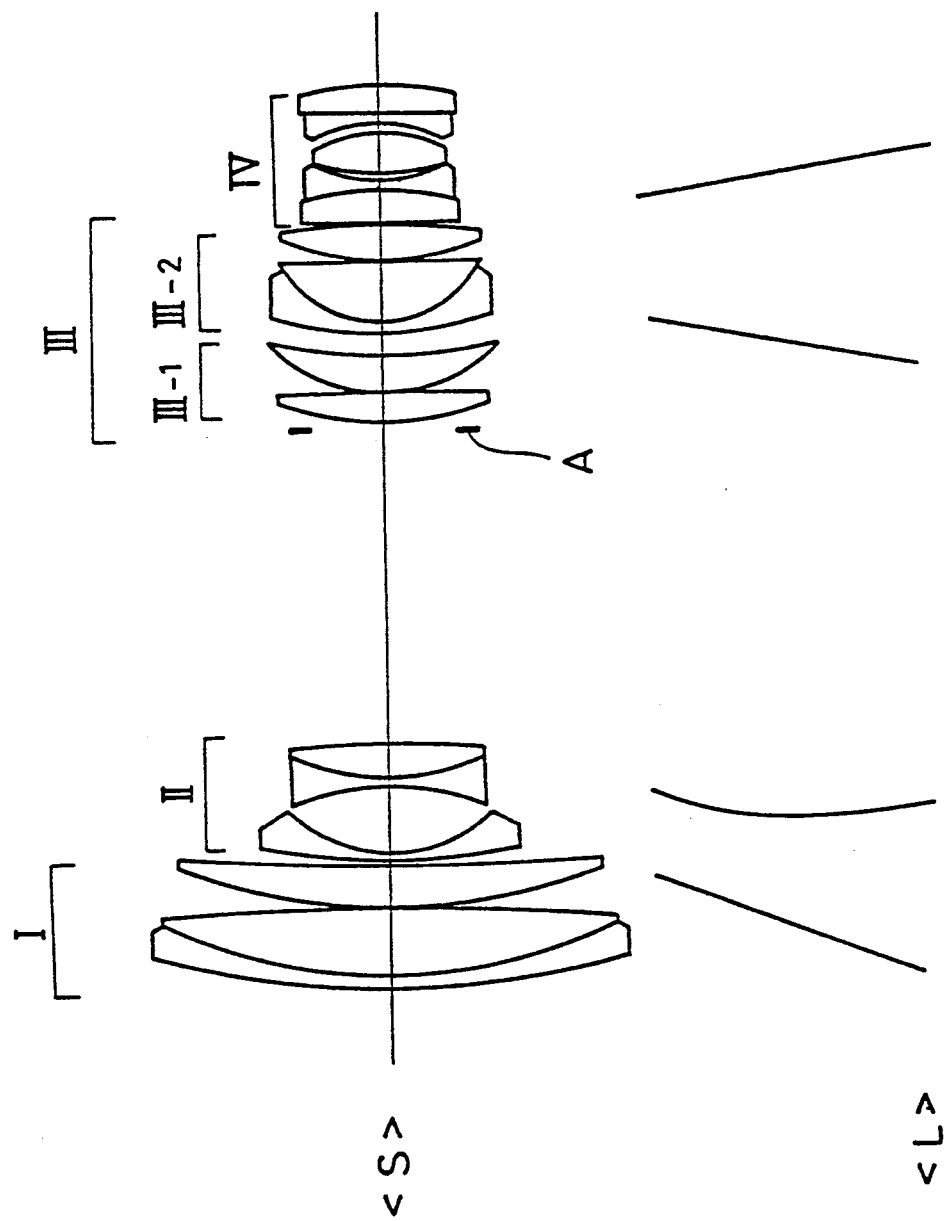
FIG. 2 shows a sectional view illustrating the lens configuration of the second embodiment of the present invention.
Figure 3:
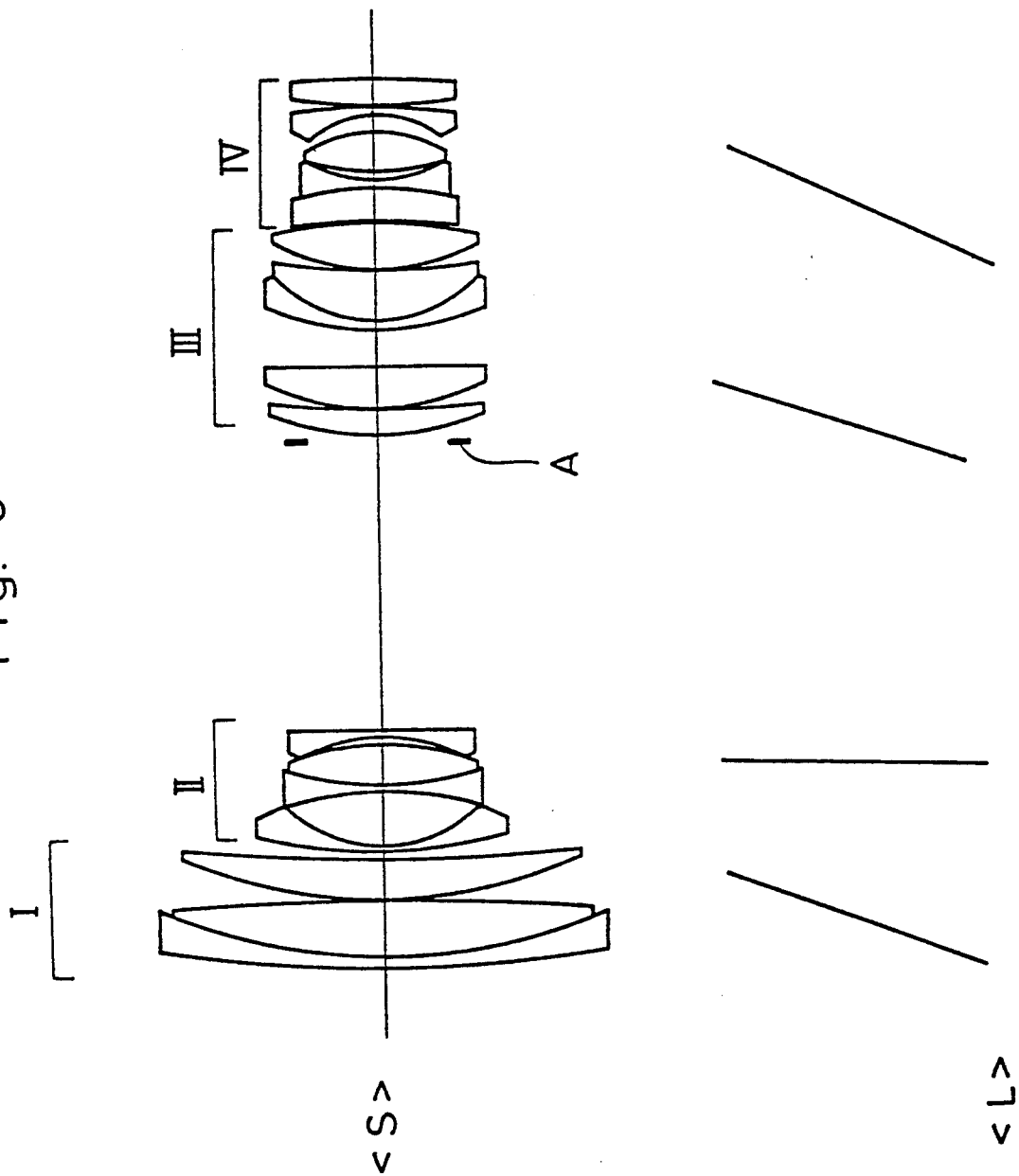
FIG. 3 shows a sectional view illustrating the lens configuration of the third embodiment of the present invention.

FIGS. 1-3 respectively show the lens configurations of the embodiments 1-3 at the shortest focal length $<S>$. Each drawing further has the movement curves of the four lens groups I, II, III and IV as the lens system performs zooming from the shortest focal length $<S>$ (wide angel end) to the longest focal length $<L>$ (telephoto end). In FIGS. 1 and 2, the third lens group III is divided into two sub lens groups III-1 (object side) and III-2 (image side). The configurations are drawn so that the object is to the left and the image plane is to the right, and "A" denotes an aperture stop.

In every embodiment, the zoom lens system includes, from the object to the image side, a first lens group I having a positive refractive power, a second lens group II having a negative refractive power, a third lens group III having a positive refractive power and a fourth lens group IV having a negative refractive power. The zoom lens system is arranged to fulfill the following conditions:

$$0.15 < f_s/f_1 < 0.3 \tag{1}$$

$$0.45 < f_L/(f_s \cdot |f_2|) < 0.8 \tag{2}$$

$$0.15 < f_s/f_1 < 0.32 \tag{3}$$

where $f_1$, $f_2$ and $f_3$ are the focal lengths of the first, second and third lens groups respectively, and $f_s$ and $f_L$ are respectively the shortest and the longest focal lengths of the zoom lens system.

When the zoom lens system performs a zooming operation from a shorter focal length (wide) to a longer focal length (tele), the first lens group moves toward the object side. This obviates the necessity of increasing the diameter of the first lens group for the purpose of securing brightness of the edge of the image field.

The air space (axial distance) between the second lens group and the third lens group is decreased, and both the second and third lens groups are shifted toward the object side in zooming to a longer focal length. The fourth lens group may be moved either toward the image side or toward the object side, whereby the air space between the third and fourth lens groups may increase or decrease. This means that every lens group moves during a zooming operation, and every lens group is assigned a portion of the varifocal function, which leads to a higher zoom ratio and compactness of the zoom lens system.

The formula (1) defines the refractive power of the first lens group. When the value of $f_s/f_1$ exceeds the upper limit 0.3, distortions especially at the longest focal length (telephoto end) becomes intolerable. When the value of $f_s/f_1$ becomes smaller than the lower limit 0.15, the whole length of the zoom lens system becomes too long for compactness in size.

For achieving a high zoom ratio up to 10, as in the present invention, the refractive power of the second lens group needs to be strong. The formula (2) defines the refractive power of the second lens group. When the value of $f_L/(f_s \cdot |f_2|)$ exceeds the upper limit 0.8, correction of the spherical aberration becomes difficult especially at the longest focal length (telephoto end). When the value of $f_L/(f_s \cdot |f_2|)$ becomes smaller than the lower limit 0.45, the whole length of the zoom lens system becomes intolerably large for a compact zoom lens system with the zoom ratio of 10.

The formula (3) defines a practical range of the refractive power of the third lens group. When the value of $f_3/f_1$ is smaller than the lower limit 0.15, the refractive powers of the second and third lens groups should be too strong under the condition of formula (1), which makes correction of various aberrations difficult. When the value of $f_s/f_1$ exceeds the upper limit 0.32, the compactness of the zoom lens system is spoiled.

The zoom lens system is preferred to further fulfill the following conditions:

$$0.35 < f_1/f_L < 0.4 \quad (4)$$

$$1.2 < |f_4|/|f_2| < 4.8 \quad (5)$$

where $f_4$ is the focal length of the fourth lens group.

Formula (4) further defines the refractive power of the first lens group. When the refractive power of the first lens group is too strong with the value of $f_1/f_L$ smaller than the lower limit 0.35, the overall length of the zoom lens system is too long at the telephoto end. When the value of $f_1/f_L$ exceeds the upper limit 0.4, the shifting amount of the first lens group is too large to obtain a predetermined zoom ratio, which also increases the overall length of the zoom lens system at the longest focal length condition.

The formula (5) defines the refractive power of the fourth lens group in relation to the second lens group. This requirement is introduced to well control the focal length of the overall zoom lens system and to correct various aberrations of the lens system on balance at high level. When the refractive power of the fourth lens group is too strong with the ratio $|f_4|/|f_2|$ smaller than the lower limit 1.2, the refractive power of the third lens group should be accordingly strong, which increases aberration fluctuations during zooming. When the ratio $|f_4|/|f_2|$ is larger than the upper limit 4.8, it will become difficult to correct various aberrations balancing at a high level.

The third lens group III may be divided into two lens groups, as a third front lens group III-1 having a positive refractive power and a third rear lens group III-2 having a negative refractive power. The incident ray of the third rear lens group III-2 is approximately parallel pencil of rays. On this condition, the third front III-1 and rear III-2 lens groups perform floating during zooming. For example, when zooming from wide to tele, the third lens group as a whole is shifted toward the object side while the distance between the third front lens group and the third rear lens group is decreased. By varying the air space between the front and rear lens groups within the third lens group between which the luminous flux is almost parallel, curvature of field (which is especially difficult to correct at a wide angle) can be effectively corrected in the entire zooming range.

It is further preferable in the present invention to place an aperture stop near or within the third lens group and provide an aspherical surface for the lens in the third lens group adjacent to the aperture stop. This configuration better corrects spherical aberration and off-axial coma aberration.

In the first embodiment shown in FIG. 1, the aperture A is placed at the image side of the third front lens group III-1, and shifted with the third front lens group III-1 during a zooming operation. The object side surface of the third lens element counted from the object side in the third front lens group III-1 is an aspherical surface.

In the second and third embodiments shown in FIGS. 2 and 3, the aperture A is placed at the object side of the third lens group III, and shifted with the third front lens group III-1 in FIG. 2 and with the third lens group III in FIG. 3 during a zooming operation. The most object side surface of the third lens group III is aspherical in the second and third embodiments.

Constructions of the zoom lens systems of the first, second and third embodiments are described by following tables in which:

$r_i$ is the radius of curvature of the i-th surface as counted from the object side to the image side;

$d_i$ is the axial distance between two adjacent surfaces i and i+1;

$N_j$ is the refractive index for the d line of the j-th lens element as counted from the object side to the image side;

$\nu_j$ is the Abbe number of the j-th lens element;

f is the focal length of the overall lens system; and $F_{NO}$ is the open (minimum) f-number.

In the following tables, the surface with an asterisk (*) after the radius of curvature $(r_i)$ is an aspherical surface, whose surface shape is defined by:

$$x(y) = \frac{C_0 y^2}{1 + (1 - C_0^2 y^2)^{\frac{1}{2}}} + \Sigma A_i y^i$$

where
- y: height from the optical axis,
- x(y): axial deviation of the aspherical surface from its vertex at a height y,
- $C_o$: radius of curvature at the vertex, and
- $A_i$: aspherical coefficient of the i-th order.

TABLE 1

<Embodiment 1>
$f = 28.8 \sim 100.0 \sim 290.2, \quad F_{NO} = 4.1 \sim 5.6 \sim 6.8$

| | radius of curvature | axial distance | refractive index | Abbe number |
|---|---|---|---|---|
| I | $r_1 = 123.380$ | | | |
| | | $d_1 = 1.800$ | $N_1 = 1.84666$ | $\nu_1 = 23.88$ |
| | $r_2 = 73.369$ | | | |
| | | $d_2 = 8.670$ | $N_2 = 1.64000$ | $\nu_2 = 60.20$ |
| | $r_3 = -557.153$ | | | |
| | | $d_3 = 0.200$ | | |
| | $r_4 = 69.359$ | | | |
| | | $d_4 = 7.000$ | $N_3 = 1.49700$ | $\nu_3 = 81.61$ |
| | $r_5 = 172.339$ | | | |
| | | $d_5 = 1.000 \sim 30.605 \sim 53.685$ | | |

TABLE 1-continued

<Embodiment 1>
f = 28.8~100.0~290.2,  $F_{NO}$ = 4.1~5.6~6.8

| | radius of curvature | axial distance | refractive index | Abbe number |
|---|---|---|---|---|
| II | $r_6$ = 40502.226 | | | |
| | | $d_6$ = 1.100 | $N_4$ = 1.80400 | $v_4$ = 46.60 |
| | $r_7$ = 20.807 | | | |
| | | $d_7$ = 7.690 | | |
| | $r_8$ = −50.224 | | | |
| | | $d_8$ = 1.000 | $N_5$ = 1.80400 | $v_5$ = 46.60 |
| | $r_9$ = 31.142 | | | |
| | | $d_9$ = 4.170 | $N_6$ = 1.84666 | $v_6$ = 23.88 |
| | $r_{10}$ = 254.439 | | | |
| | | $d_{10}$ = 0.200 | | |
| | $r_{11}$ = 40.973 | | | |
| | | $d_{11}$ = 3.000 | $N_7$ = 1.75520 | $v_7$ = 27.51 |
| | $r_{12}$ = 100.892 | | | |
| | | $d_{12}$ = 41.753~18.012~1.040 | | |
| III-1 | $r_{13}$ = 54.773 | | | |
| | | $d_{13}$ = 1.100 | $N_8$ = 1.84666 | $v_8$ = 23.88 |
| | $r_{14}$ = 22.831 | | | |
| | | $d_{14}$ = 3.920 | $N_9$ = 1.48749 | $v_9$ = 70.15 |
| | $r_{15}$ = 157.596 | | | |
| | | $d_{15}$ = 0.200 | | |
| | $r_{16}$* = 31.774 | | | |
| | | $d_{16}$ = 3.000 | $N_{10}$ = 1.84666 | $v_{10}$ = 23.88 |
| | $r_{17}$ = 73.867 | | | |
| | | $d_{17}$ = 1.400 | | |
| | $r_{18}$ = ∞ (Stop) | | | |
| | | $d_{18}$ = 11.059~1.500~1.200 | | |
| III-2 | $r_{19}$ = 24.510 | | | |
| | | $d_{19}$ = 1.500 | $N_{11}$ = 1.83481 | $v_{11}$ = 42.72 |
| | $r_{20}$ = 18.000 | | | |
| | | $d_{20}$ = 5.500 | $N_{12}$ = 1.74100 | $v_{12}$ = 52.67 |
| | $r_{21}$ = 42.170 | | | |
| | | $d_{21}$ = 0.200 | | |
| | $r_{22}$ = 40.450 | | | |
| | | $d_{22}$ = 3.800 | $N_{13}$ = 1.48749 | $v_{13}$ = 70.15 |
| | $r_{23}$ = 66.430 | | | |
| | | $d_{23}$ = 2.690~2.209~1.500 | | |
| IV | $r_{24}$ = 24.686 | | | |
| | | $d_{24}$ = 5.000 | $N_{14}$ = 1.60311 | $v_{14}$ = 60.74 |
| | $r_{25}$ = −35.992 | | | |
| | | $d_{25}$ = 1.000 | $N_{15}$ = 1.83481 | $v_{15}$ = 42.72 |
| | $r_{26}$ = 18.472 | | | |
| | | $d_{26}$ = 1.280 | | |
| | $r_{27}$ = 25.884 | | | |
| | | $d_{27}$ = 1.200 | $N_{16}$ = 1.84666 | $v_{16}$ = 23.88 |
| | $r_{28}$ = 15.579 | | | |
| | | $d_{28}$ = 5.510 | $N_{17}$ = 1.56732 | $v_{17}$ = 42.82 |
| | $r_{29}$ = −18.273 | | | |
| | | $d_{29}$ = 1.650 | | |
| | $r_{30}$ = −15.561 | | | |
| | | $d_{30}$ = 1.000 | $N_{18}$ = 1.80400 | $v_{18}$ = 46.60 |
| | $r_{31}$ = −163.192 | | | |
| | | $d_{31}$ = 0.200 | | |
| | $r_{32}$ = −1489.114 | | | |
| | | $d_{32}$ = 3.700 | $N_{19}$ = 1.84666 | $v_{19}$ = 23.88 |
| | $r_{33}$ = −67.582 | | | |

*Aspherical coefficients of the 16th surface ($r_{16}$):
$A_4$ = −0.82000 × $10^{-6}$
$A_6$ = 0.59438 × $10^{-8}$
$A_8$ = −0.21405 × $10^{-10}$
$A_2, A_3, A_5, A_7, A_9, A_{10}, A_{11}, A_{12}, A_{13}, A_{14}, A_{15}, A_{16}$ = 0

The ratios between focal lengths of the component lens groups $f_1$, $f_2$, $f_3$, $f_4$, and the longest focal length $f_L$ (which corresponds to the telephoto end) and the shortest focal length $f_S$ (which corresponds to the wide angle end) of the overall zoom lens system are as follows:

$f_S/f_1$ = 0.274

$f_L/(f_S \cdot |f_2|)$ = 0.471

$f_S/f_1$ = 0.318

$f_1/f_L$ = 0.363

$|f_4|/|f_2|$ = 4.540

TABLE 2

<Embodiment 2>
$f = 28.8 \sim 100.0 \sim 290.0$,  $F_{NO} = 4.1 \sim 5.5 \sim 5.8$

| | radius of curvature | axial distance | refractive index | Abbe number |
|---|---|---|---|---|
| I | $r_1 = 111.532$ | $d_1 = 1.800$ | $N_1 = 1.80518$ | $\nu_1 = 25.43$ |
| | $r_2 = 69.989$ | $d_2 = 9.110$ | $N_2 = 1.48749$ | $\nu_2 = 70.15$ |
| | $r_3 = -362.277$ | $d_3 = 0.200$ | | |
| | $r_4 = 77.898$ | $d_4 = 5.500$ | $N_3 = 1.49700$ | $\nu_3 = 81.61$ |
| | $r_5 = 315.295$ | $d_5 = 1.000 \sim 37.006 \sim 58.853$ | | |
| II | $r_6 = 91.777$ | $d_6 = 1.100$ | $N_4 = 1.69680$ | $\nu_4 = 55.43$ |
| | $r_7 = 19.515$ | $d_7 = 8.830$ | | |
| | $r_8 = -30.416$ | $d_8 = 1.000$ | $N_5 = 1.83481$ | $\nu_5 = 42.72$ |
| | $r_9 = 30.013$ | $d_9 = 5.000$ | $N_6 = 1.84666$ | $\nu_6 = 23.88$ |
| | $r_{10} = -110.037$ | $d_{10} = 42.863 \sim 20.075 \sim 1.040$ | | |
| | $r_{11} = \infty$ (Stop) | $d_{11} = 1.500$ | | |
| III-1 | $r_{12}^* = 42.747$ | $d_{12} = 3.500$ | $N_7 = 1.48749$ | $\nu_7 = 70.15$ |
| | $r_{13} = -3334.111$ | $d_{13} = 0.0$ | | |
| | $r_{14} = 21.649$ | $d_{14} = 5.000$ | $N_8 = 1.48749$ | $\nu_8 = 70.15$ |
| | $r_{15} = 68.825$ | $d_{15} = 2.953 \sim 1.500 \sim 1.200$ | | |
| III-2 | $r_{16} = 46.635$ | $d_{16} = 1.500$ | $N_9 = 1.83400$ | $\nu_9 = 37.16$ |
| | $r_{17} = 16.015$ | $d_{17} = 8.050$ | $N_{10} = 1.48749$ | $\nu_{10} = 70.15$ |
| | $r_{18} = 349.629$ | $d_{18} = 0.200$ | | |
| | $r_{19} = 31.379$ | $d_{19} = 4.800$ | $N_{11} = 1.72000$ | $\nu_{11} = 50.31$ |
| | $r_{20} = -137.742$ | $d_{20} = 0.300 \sim 1.980 \sim 6.108$ | | |
| IV | $r_{21} = 276.172$ | $d_{21} = 5.000$ | $N_{12} = 1.80518$ | $\nu_{12} = 25.43$ |
| | $r_{22} = -29.725$ | $d_{22} = 1.000$ | $N_{13} = 1.83400$ | $\nu_{13} = 37.16$ |
| | $r_{23} = 18.386$ | $d_{23} = 1.280$ | | |
| | $r_{24} = 29.896$ | $d_{24} = 5.300$ | $N_{14} = 1.48749$ | $\nu_{14} = 70.15$ |
| | $r_{25} = -18.430$ | $d_{25} = 1.500$ | | |
| | $r_{26} = -16.043$ | $d_{26} = 1.000$ | $N_{15} = 1.83481$ | $\nu_{15} = 42.72$ |
| | $r_{27} = 365.446$ | $d_{27} = 3.700$ | $N_{16} = 1.71736$ | $\nu_{16} = 29.42$ |
| | $r_{28} = -51.668$ | | | |

*Aspherical coefficients of the 12th surface ($r_{12}$):
$A_4 = -0.64651 \times 10^{-5}$
$A_6 = -0.86721 \times 10^{-8}$
$A_8 = 0.30180 \times 10^{-10}$
$A_{10} = -0.12534 \times 10^{-12}$
$A_2, A_3, A_5, A_7, A_9, A_{11}, A_{12}, A_{13}, A_{14}, A_{15}, A_{16} = 0$ The ratios are as follows:

$f_S/f_1 = 0.253$ $f_L/(f_S \cdot |f_2|) = 0.507$ $f_S/f_1 = 0.214$ $f_1/f_L = 0.393$ $|f_4|/|f_2| = 1.351$

TABLE 3

<Embodiment 3>
$f = 28.8 \sim 99.5 \sim 289.8$,  $F_{NO} = 4.1 \sim 5.6 \sim 5.8$

| radius of curvature | axial distance | refractive index | Abbe number |
|---|---|---|---|
| $r_1 = 205.611$ | $d_1 = 1.800$ | $N_1 = 1.84666$ | $\nu_1 = 23.88$ |
| $r_2 = 82.398$ | | | |

TABLE 3-continued

<Embodiment 3>
$f = 28.8 \sim 99.5 \sim 289.8$, $F_{NO} = 4.1 \sim 5.6 \sim 5.8$

| | radius of curvature | axial distance | refractive index | Abbe number |
|---|---|---|---|---|
| I | | $d_2 = 8.120$ | $N_2 = 1.51728$ | $\nu_2 = 69.56$ |
| | $r_3 = -298.324$ | $d_3 = 0.200$ | | |
| | $r_4 = 74.904$ | $d_4 = 5.500$ | $N_3 = 1.74320$ | $\nu_3 = 49.41$ |
| | $r_5 = 302.232$ | $d_5 = 1.000 \sim 33.514 \sim 54.782$ | | |
| II | $r_6 = 70.100$ | $d_6 = 1.100$ | $N_4 = 1.77250$ | $\nu_4 = 49.66$ |
| | $r_7 = 19.379$ | $d_7 = 7.590$ | | |
| | $r_8 = -46.493$ | $d_8 = 1.000$ | $N_5 = 1.83481$ | $\nu_5 = 42.72$ |
| | $r_9 = 48.419$ | $d_9 = 6.000$ | $N_6 = 1.84666$ | $\nu_6 = 23.88$ |
| | $r_{10} = -33.489$ | $d_{10} = 0.800$ | | |
| | $r_{11} = -28.274$ | $d_{11} = 1.200$ | $N_7 = 1.83481$ | $\nu_7 = 42.72$ |
| | $r_{12} = -333.333$ | $d_{12} = 41.197 \sim 19.307 \sim 1.500$ | | |
| | $r_{13} = \infty$ (Stop) | $d_{13} = 1.100$ | | |
| III | $r_{14}^* = 36.258$ | $d_{14} = 3.500$ | $N_8 = 1.48749$ | $\nu_8 = 70.15$ |
| | $r_{15} = 117.872$ | $d_{15} = 0.200$ | | |
| | $r_{16} = 35.842$ | $d_{16} = 6.000$ | $N_9 = 1.49700$ | $\nu_9 = 81.61$ |
| | $r_{17} = 640.139$ | $d_{17} = 5.114$ | | |
| | $r_{18} = 40.186$ | $d_{18} = 1.500$ | $N_{10} = 1.80610$ | $\nu_{10} = 33.27$ |
| | $r_{19} = 19.752$ | $d_{19} = 7.000$ | $N_{11} = 1.48749$ | $\nu_{11} = 70.15$ |
| | $r_{20} = 112.624$ | $d_{20} = 0.200$ | | |
| | $r_{21} = 28.209$ | $d_{21} = 6.500$ | $N_{12} = 1.51742$ | $\nu_{12} = 52.41$ |
| | $r_{22} = -68.716$ | $d_{22} = 0.300 \sim 1.892 \sim 6.987$ | | |
| IV | $r_{23} = -143.195$ | $d_{23} = 5.000$ | $N_{13} = 1.84666$ | $\nu_{13} = 23.88$ |
| | $r_{24} = -40.510$ | $d_{24} = 1.000$ | $N_{14} = 1.83400$ | $\nu_{14} = 37.16$ |
| | $r_{25} = 22.454$ | $d_{25} = 1.280$ | | |
| | $r_{26} = 39.521$ | $d_{26} = 5.300$ | $N_{15} = 1.51742$ | $\nu_{15} = 52.41$ |
| | $r_{27} = -20.009$ | $d_{27} = 2.820$ | | |
| | $r_{28} = -16.561$ | $d_{28} = 1.000$ | $N_{16} = 1.83481$ | $\nu_{16} = 42.72$ |
| | $r_{29} = -79.441$ | $d_{29} = 0.150$ | | |
| | $r_{30} = 90.443$ | $d_{30} = 3.700$ | $N_{17} = 1.83400$ | $\nu_{17} =$ INAREA 6 |
| | $r_{31} = -211.978$ | | | |

*Aspherical coefficients of the 14th surface ($r_{14}$):
$A_4 = -0.51647 \times 10^{-5}$
$A_6 = -0.45734 \times 10^{-8}$
$A_8 = -0.10521 \times 10^{-10}$
$A_{10} = 0.14358 \times 10^{-13}$
$A_2, A_3, A_5, A_7, A_9, A_{11}, A_{12}, A_{13}, A_{14}, A_{15}, A_{16} = 0$ The ratios are as follows:

$f_S/f_1 = 0.270$ $f_L/(f_S \cdot |f_2|) = 0.529$ $f_3/f_1 = 0.250$ $f_1/f_L = 0.368$ $|f_4|/|f_2| = 1.802$ FIGS. 4a–6c show various aberrations of the lens systems of the embodiments, where FIGS. 4a–4c are for the embodiment 1, FIGS. 5a–5c are for the embodiment 2 and FIGS. 6a–6c are for the embodiment 3, and <S> indicates aberration curves at the shortest focal length (wide angel end), <M> at the intermediate focal length and <L> at the longest focal length (telephoto end). In FIGS. 4a–6c: solid lines denoted by d show spherical aberrations for the d line; dashed lines SC represent sine conditions; dashed lines DM represent meridional image surfaces; and solid lines DS represent saggital image surfaces.

What is claimed is:

1. A zoom lens system of a high zoom ratio ranging to a wide angle photography in which the shortest focal length is less than the length of the diagonal line of the effective image plane, the zoom lens system comprising, from the object to the image side, a first lens group having a positive refractive power, a second lens group having a negative refractive power, a third lens group having a positive refractive power and a fourth lens group having a negative refractive power, the zoom lens system being operated by changing the air distances between adjacent lens groups during a zooming, the zoom lens system being arranged to fulfill the following conditions:

$$0.15 < f_s/f_1 < 0.3$$

$$0.45 < f_L/(f_s |f_2|) < 0.8$$

$$0.15 < f_s/f_1 < 0.32$$

where $f_1$, $f_2$ and $f_s$ are the focal lengths of the first, second and third lens groups respectively, and $f_s$ and $f_L$ are respectively the shortest and the longest focal lengths of the zoom lens system.

2. The zoom lens system according to claim 1 and further fulfilling the following conditions:

$$0.35 < f_1/f_L < 0.4$$

$$1.2 < |f_4|/|f_2| < 4.8$$

where $f_4$ is the focal length of the fourth lens group.

3. The zoom lens system according to claim 1 where the third lens group is divided into a third front lens group and a third rear lens group, the third front lens group and the third rear lens group floating during a zooming of the zoom lens system.

4. The zoom lens system according to claim 3, where the third lens group as a whole is shifted toward the object side while the distance between the third front lens group and the third rear lens group is decreased during a zooming from a shorter focal length to a longer focal length.

5. The zoom lens system according to claim 3, where an aperture stop is placed between the third front lens group and the third rear lens group, and the lens in the third lens group adjacent to the aperture stop has an aspherical surface.

6. The zoom lens system according to claim 1, where an aperture stop is placed proximate to the third lens group, and the lens in the third lens group adjacent to the aperture stop has an aspherical surface.

7. A zoom lens system of a high zoom ratio ranging to a wide angle photography in which the shortest focal length is less than the length of the diagonal line of the effective image plane, the zoom lens system comprising, from the object to the image side, a first lens group having a positive refractive power, a second lens group having a negative refractive power, a third lens group having a positive refractive power and a fourth lens group having a negative refractive power, an aspherical surface being provided in the third lens group, the zoom lens system being operated by changing the air distances between adjacent lens groups during a zooming, and the zoom lens system being arranged to fulfill the following conditions:

$$0.15 < f_s/f_1 < 0.3$$

$$0.45 < f_L/(f_s |f_2|) < 0.8$$

$$0.15 < f_s/f_1 < 0.32$$

where $f_1$, $f_2$ and $f_3$ are the focal lengths of the first, second and third lens groups respectively, and $f_s$ and $f_L$ are respectively the shortest and the longest focal lengths of the zoom lens system.

* * * * *